US012698074B2

(12) United States Patent
Chantal et al.

(10) Patent No.: US 12,698,074 B2
(45) Date of Patent: Aug. 4, 2026

(54) SYSTEM FOR AUTOMATIC AND REMOTE CLOSURE AND OPENING OF A DOOR DESIGNED FOR ACCESS TO AN AIRCRAFT FUSELAGE, AUTOMATIC CLOSURE METHOD AND AUTOMATIC OPENING METHOD

(71) Applicant: Airbus Canada Limited Partnership, Mirabel (CA)

(72) Inventors: Béranger Chantal, Mirabel (CA); Rainer Kloetergens, Mirabel (CA); Laurent Schmitt, Mirabel (CA)

(73) Assignee: Airbus Canada Limited Partnership, Mirabel (CA)

( * ) Notice: Subject to any disclaimer, the term of this patent is extended or adjusted under 35 U.S.C. 154(b) by 0 days.

(21) Appl. No.: 19/179,558

(22) Filed: Apr. 15, 2025

(65) Prior Publication Data

US 2026/0159214 A1    Jun. 11, 2026

(30) Foreign Application Priority Data

Apr. 17, 2024    (FR) ...................................... 2403998

(51) Int. Cl.
| | |
|---|---|
| *B64C 1/14* | (2006.01) |
| *E05B 47/00* | (2006.01) |
| *E05F 15/77* | (2015.01) |

(52) U.S. Cl.
CPC ............ B64C 1/1407 (2013.01); B64C 1/143 (2013.01); B64C 1/1438 (2013.01);
(Continued)

(58) Field of Classification Search
CPC ..... B64C 1/1407; B64C 1/1423; B64C 1/143; B64C 1/1438
See application file for complete search history.

(56) References Cited

U.S. PATENT DOCUMENTS 2,445,131 A * 7/1948 Wartian ................ B64C 1/1438
                                                    244/129.5
3,802,125 A * 4/1974 Baker ................... E05F 15/665
                                                      49/40
(Continued)

FOREIGN PATENT DOCUMENTS

EP        4129819 A1    2/2023
GB        1228969 A  * 4/1971  ........... B64C 1/1407

OTHER PUBLICATIONS

French Search Report for corresponding French Patent Application No. 2403998 dated Oct. 31, 2024.

*Primary Examiner* — Joshua J Michener
*Assistant Examiner* — Michael B. Kreiner
(74) *Attorney, Agent, or Firm* — Greer, Burns & Crain, Ltd.

(57)    ABSTRACT

A system comprises a support to be secured integrally on the fuselage of an aircraft, an elongate structure which can be displaced in relation to the support, between an extended position and a retracted position, a device for locking and unlocking, in order to bring the locking lever alternately into an unlocking position and a locking position, a device for closure and opening in order to thrust the articulation arm, so as to bring the leaf towards the open position, and to catch on the arm, then to draw the arm in order to bring the leaf towards the closed position, and a control device to transmit orders to command closure or opening of the leaf to the device and orders to command locking or unlocking.

16 Claims, 8 Drawing Sheets

(52) U.S. Cl.
   CPC .......... *E05B 47/0001* (2013.01); *E05F 15/77*
       (2015.01); *E05B 2047/0094* (2013.01); *E05Y*
                                   *2900/502* (2013.01)

(56)                    References Cited

U.S. PATENT DOCUMENTS

| | | | |
|---|---|---|---|
| 5,163,639 | A | 11/1992 | Herrmann et al. |
| 5,180,121 | A * | 1/1993 | Banks ..................... E05F 15/72 |
| | | | 49/237 |
| 5,289,615 | A * | 3/1994 | Banks ..................... E05D 3/122 |
| | | | 244/905 |
| 5,379,971 | A * | 1/1995 | Kim ...................... B64C 1/1407 |
| | | | 244/129.5 |
| 5,687,452 | A * | 11/1997 | Hamatani ............... E05D 3/127 |
| | | | 137/493 |
| 6,109,563 | A | 8/2000 | Verhoeven et al. |
| 6,189,833 | B1 * | 2/2001 | Ambrose ............. B64C 1/1438 |
| | | | 244/129.5 |
| 8,070,102 | B2 * | 12/2011 | Kobayashi ............ B64C 1/1438 |
| | | | 49/213 |
| 8,919,699 | B2 * | 12/2014 | Kress .................... B64C 1/1407 |
| | | | 244/129.4 |
| 10,066,430 | B2 * | 9/2018 | Joussellin ............. B64C 1/1438 |
| 11,668,127 | B2 * | 6/2023 | Chambers ............. B64C 1/1438 |
| | | | 49/210 |
| 2022/0356741 | A1 | 11/2022 | Long |

* cited by examiner

SYSTEM FOR AUTOMATIC AND REMOTE CLOSURE AND OPENING OF A DOOR DESIGNED FOR ACCESS TO AN AIRCRAFT FUSELAGE, AUTOMATIC CLOSURE METHOD AND AUTOMATIC OPENING METHOD

CROSS-REFERENCES TO RELATED APPLICATIONS

This application claims the benefit of French Patent Application Number 2403998 filed on Apr. 17, 2024, the entire disclosure of which is incorporated herein by way of reference.

FIELD OF THE INVENTION

The present invention concerns a system for automatic and remote closure and opening of a door designed for access to an aircraft fuselage. It also concerns an automatic closure method and an automatic opening method implemented by the said system.

BACKGROUND OF THE INVENTION

Aircraft have at least one access opening making it possible to embark on the aircraft or disembark from the aircraft. In order to access the access opening for embarking or disembarking, it is possible to use access stairs (airstairs) which are or are not incorporated in the aircraft. For example, after an aircraft has landed, the crew opens manually the leaf of a door for access to the access opening.

The access stairs are deployed or positioned well in front of the access opening. The passengers and crew members can then disembark from the aircraft. However, it is no longer possible to close the leaf of the door after all the crew members have disembarked. Nor is it possible to open the leaf of the door for an embarkation after the leaf has been closed. In fact, the closure mechanism which makes it possible to close and open the leaf manually is not accessible to people who are not on board the aircraft.

SUMMARY OF THE INVENTION

An objective of the present invention is to reduce or eliminate this disadvantage so that a person who is not on board an aircraft can open or close the leaf.

For this purpose, the present invention concerns a system for automatic and remote closure and opening of a door designed for an opening for access to an aircraft fuselage, the door comprising a leaf, a frame delimiting the access opening and an articulation arm, the frame being secured integrally on the fuselage and having two uprights, the leaf being configured to be alternately in a closed position, when the leaf closes the access opening, and an open position, when the leaf leaves the access opening open, with the articulation arm comprising a first end articulated on the leaf, and a second end articulated on the frame, such that the leaf remains parallel to itself when it goes from the open position to the closed position and vice versa, the door also comprising a locking mechanism which is configured alternately to lock and unlock the leaf when the leaf is in the closed position, the locking mechanism comprising a locking lever, an end of which is fitted such as to rotate on the leaf around an axis of rotation perpendicular to the leaf, the locking lever being configured to be alternately in a locking position, in which the locking mechanism locks the leaf, and an unlocking position, in which the locking mechanism does not lock the leaf.

According to the invention, the opening and closure system comprises:

- a support designed to be secured integrally on the fuselage;
- an elongate structure having a longitudinal axis, the elongate structure being connected by a slide connection on the support, such that the elongate structure can be displaced relative to the support along its longitudinal axis perpendicularly to the two uprights of the frame, the slide connection being configured such that the elongate structure can be alternately in an extended position in which the elongate structure is facing the access opening, and in a retracted position of the elongate structure, in which the elongate structure is not opposite the access opening;
- a locking and unlocking device fitted on the elongate structure, the locking and unlocking device being configured to bring the locking lever alternately into the unlocking position, for unlocking of the leaf when the elongate structure is in its extended position, and into the locking position for locking of the leaf when the elongate structure is in its extended position;
- a closure and opening device fitted on the elongate structure, the closure and opening device being configured alternately to thrust the articulation arm in order to bring the leaf towards the open position, when the elongate structure is in its extended position, and to catch on the articulation arm, then to draw the articulation arm in order to bring the leaf towards the closed position, when the elongate structure is in the extended position;
- a control device configured to transmit orders to command closure or opening of the leaf to the closure and opening device, and orders to command locking or unlocking to the locking and unlocking device, according to command orders transmitted remotely to the control device by a user.

Thus, it is possible to close or open the leaf of an aircraft by the control device, without needing to be on board the aircraft.

In addition, the closure and opening system comprises a first actuator which is configured to actuate the slide connection.

Furthermore, the elongate structure has a first longitudinal end, the first longitudinal end comprising a first deformable parallelogram mechanism fitted on the slide connection, the first deformable parallelogram mechanism being configured to be in an extended position when the elongate structure is in the extended position, the first deformable parallelogram mechanism being configured to be in a retracted position when the elongate structure is in its retracted position, the first deformable parallelogram mechanism being configured to maintain the elongate structure parallel to the leaf, when the elongate structure goes from its retracted position to its extended position, and vice versa.

In addition, the elongate structure has a second longitudinal end, the second longitudinal end comprising a first securing element which is designed to be secured on a second securing element which is fitted integrally with the fuselage when the elongate structure is in the extended position.

Furthermore, the closure and opening device comprises an articulated arm, a second actuator, and a third actuator, the articulated arm having a first segment which can be actuated by the second actuator according to control orders sent by the control device, and a second segment which can be actuated by the third actuator according to control orders sent by the control device, the first segment being designed to be actuated by the second actuator, in order to thrust the articulation arm so as to bring the leaf towards the open position when the elongate structure is in the extended position, the second segment being designed to be actuated by the third actuator, in order to catch on the articulation arm, then to draw the articulation arm so as to bring the leaf towards the closed position when the elongate structure is in its extended position.

In addition, the first segment comprises a first end and a second end, the second segment comprising a first end and a second end, the first end of the first segment being fitted on the elongate structure by a first articulation, the first articulation being configured to permit rotation of the first segment on a plane perpendicular to the two uprights of the frame, between a retracted position of the first segment and an extended position of the first segment, the retracted position of the first segment corresponding to a position in which the first segment is retracted against the elongate structure, the second position of the first segment corresponding to a position in which the leaf is in its position opened by the support of the second end of the first segment after passage from the retracted position of the first segment to the extended position of the first segment, the second actuator being configured to rotate the first segment around the first articulation:

in order to bring the first segment from its retracted position to its extended position, and in order to bring the first segment from its extended position to its retracted position;

the second end of the first segment being fitted on the first end of the second segment by a second articulation, the second end of the second segment comprising a catching element, the second articulation being configured to permit rotation of the second segment on a plane perpendicular to the two uprights of the frame, between a retracted position of the second segment and an extended position of the second segment, the retracted position of the second segment corresponding to a position in which the second segment is retracted against the first segment, the second position of the second segment corresponding to a position in which the catching element catches on the articulation arm, the third actuator being configured to rotate the second segment around the first articulation:

in order to bring the second segment from its retracted position to its extended position, and in order to bring the second segment from its extended position to its retracted position by drawing the articulation arm until the leaf is in the closed position.

In addition, the second actuator is also configured to rotate the first segment around the first articulation while the third actuator rotates the second segment around the first articulation, in order to bring the second segment from its retracted position to its extended position, and to bring the second segment from its extended position to its retracted position, by drawing the articulation arm until the leaf is in its closed position.

In addition, the locking and unlocking device comprises a locking arm and a fourth actuator, the locking arm comprising a first end and a second end, the first end of the locking arm being fitted such as to rotate on the elongate structure by a third articulation, the second end of the locking arm comprising a first grasping device which is designed to catch on the locking lever such that the locking arm drives the locking lever from its locking position to its unlocking position, the second end of the locking arm comprising a second grasping device which is designed to catch on the locking lever such that the locking arm drives the locking lever from its unlocking position to its locking position, the fourth actuator being configured to drive the locking arm by rotation around the third articulation between a retracted position and an extended position, when the fourth actuator drives the locking arm from its retracted position to its extended position, the locking arm can drive the locking lever from its locking position to its unlocking position, while the first grasping device catches on the locking lever, when the fourth actuator drives the locking arm from its extended position to its retracted position, the locking arm can drive the locking lever from its unlocking position to its locking position while the second grasping device catches on the locking lever.

In addition, the locking arm comprises a second deformable parallelogram mechanism, the second deformable parallelogram mechanism comprising a first parallelogram side corresponding to the first end of the locking arm, and a second parallelogram side parallel to the first side, the second side corresponding to the second end of the locking arm, the second deformable parallelogram mechanism being contained on a plane which is designed to be perpendicular to the leaf, the locking arm also comprising a first follower and a second follower, the locking and unlocking device also comprising a first cam fitted integrally on the elongate structure, and a second cam fitted integrally on the elongate structure, the first follower being designed to cooperate with the first cam, such that the second deformable parallelogram mechanism brings the first grasping device facing the locking lever before the locking arm drives the locking lever from its locking position to its unlocking position, while the first grasping device is catching on the locking lever, the second follower being designed to cooperate with the second cam, such that the second deformable parallelogram mechanism brings the second grasping device facing the locking lever before the locking arm drives the locking lever from its unlocking position to its locking position, while the second grasping device is catching on the locking lever.

In addition, the first grasping device comprises two rollers which are designed to catch on the locking lever by receiving the locking lever between the two rollers when the locking arm drives the locking lever from its locking position to its unlocking position, the second grasping device comprising two rollers which are designed to catch on the locking lever when the locking arm drives the locking lever from its locking position to its unlocking position.

In addition, the catching element comprises a hook which is fitted such as to rotate on the second end of the second segment by a fourth articulation, with the fourth articulation permitting rotation of the hook parallel to the first segment and to the second segment, the hook being designed to catch on a blocking element which is designed to block the leaf in its open position after opening of the leaf, the hook also being designed to draw the blocking element in order to draw the articulation arm so as to bring the leaf towards its closed position, > the hook having a first free end and a second free end which is fitted such as to rotate on the fourth articulation by a fifth articulation, the fifth articulation permitting rotation of the hook perpendicularly to the first segment and the second segment,
>
> the hook comprising a resilient element which tends to rotate the hook in a first direction of rotation around the fifth articulation, such that the hook is in an unhooking position, the unhooking position corresponding to a position of the hook in which the first end of the hook cannot catch on the blocking element when the second segment is brought from its retracted position to its extended position,
>
> the second end of the hook comprising a finger which is designed to be supported against the blocking element when the second segment has reached its extended position, the support of the finger against the blocking element being liable to rotate the hook in a second direction of rotation which is the inverse of the first direction of rotation via the fifth articulation, until the hook is in a catching position, the catching position corresponding to a position of the hook in which the first end of the hook catches on the locking element,
>
> the resilient element can drive the hook from its catching position to its unhooking position, when the first end of the hook is no longer drawing the articulation arm, and when the finger is no longer supported against the blocking element.

The invention also concerns a method for automatic closure of the leaf by implementation of the system for closure and opening as specified above.

> The closure method comprises the following steps:
> a step of extension, in which the elongate structure is brought from its retracted position to its extended position by the slide connection;
> a step of catching, in which the closure and opening device catches on the articulation arm;
> a step of closure, in which the device for closure and opening draws the articulation arm to bring the leaf towards its closed position;
> any step of locking, in which the device for locking and unlocking brings the locking lever into the locking position in order to lock the leaf;
> the step of extension, the step of catching and the step of closure being implemented after receipt by the control device of orders to command closure transmitted remotely by a user;
> the locking step being implemented after receipt of orders to command locking from the control device.

In addition, the closure method comprises a step of retraction in which the elongate structure is brought from its extended position to its retracted position by the slide collection, with the step of retraction following the step of locking.

The invention also concerns a method for automatic opening of the leaf by implementation of the closure and opening method as specified above.

The opening method comprises the following steps:
a step of extension, in which the elongate structure is brought from its retracted position to its extended position by the slide connection;
a step of unlocking, in which the locking and unlocking device brings the locking lever into the unlocking position for unlocking of the leaf;
a step of opening, in which the device for closure and opening thrusts the articulation arm in order to bring the leaf towards its open position;
The step of extension, the step of unlocking and the step of opening being implemented after receipt by the control device of orders to command opening transmitted remotely by a user.

In addition, the opening method comprises a step of retraction in which the elongate structure is brought from its extended position to its retracted position by the slide connection, the step of retraction following the step of opening.

The invention also concerns an aircraft comprising a system for opening and closure remotely as specified above.

BRIEF DESCRIPTION OF THE DRAWINGS

The appended figures will make it easy to understand how the invention can be implemented. In these figures, identical references designate similar elements.

DETAILED DESCRIPTION OF THE PREFERRED EMBODIMENTS

Figure 1:
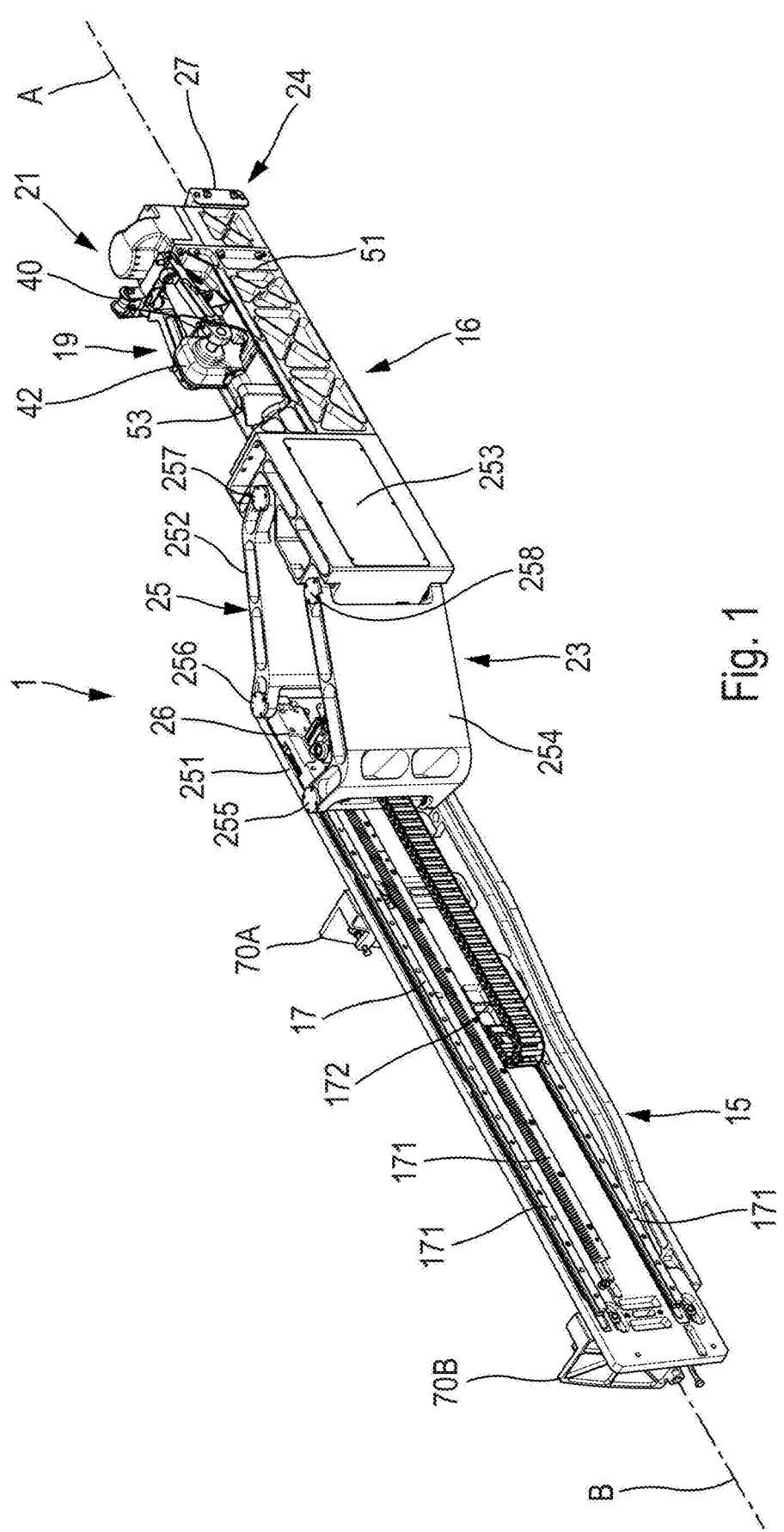
FIG. 1 represents a front view in perspective of the system for automatic closure and opening in its extended position.
Figure 2:
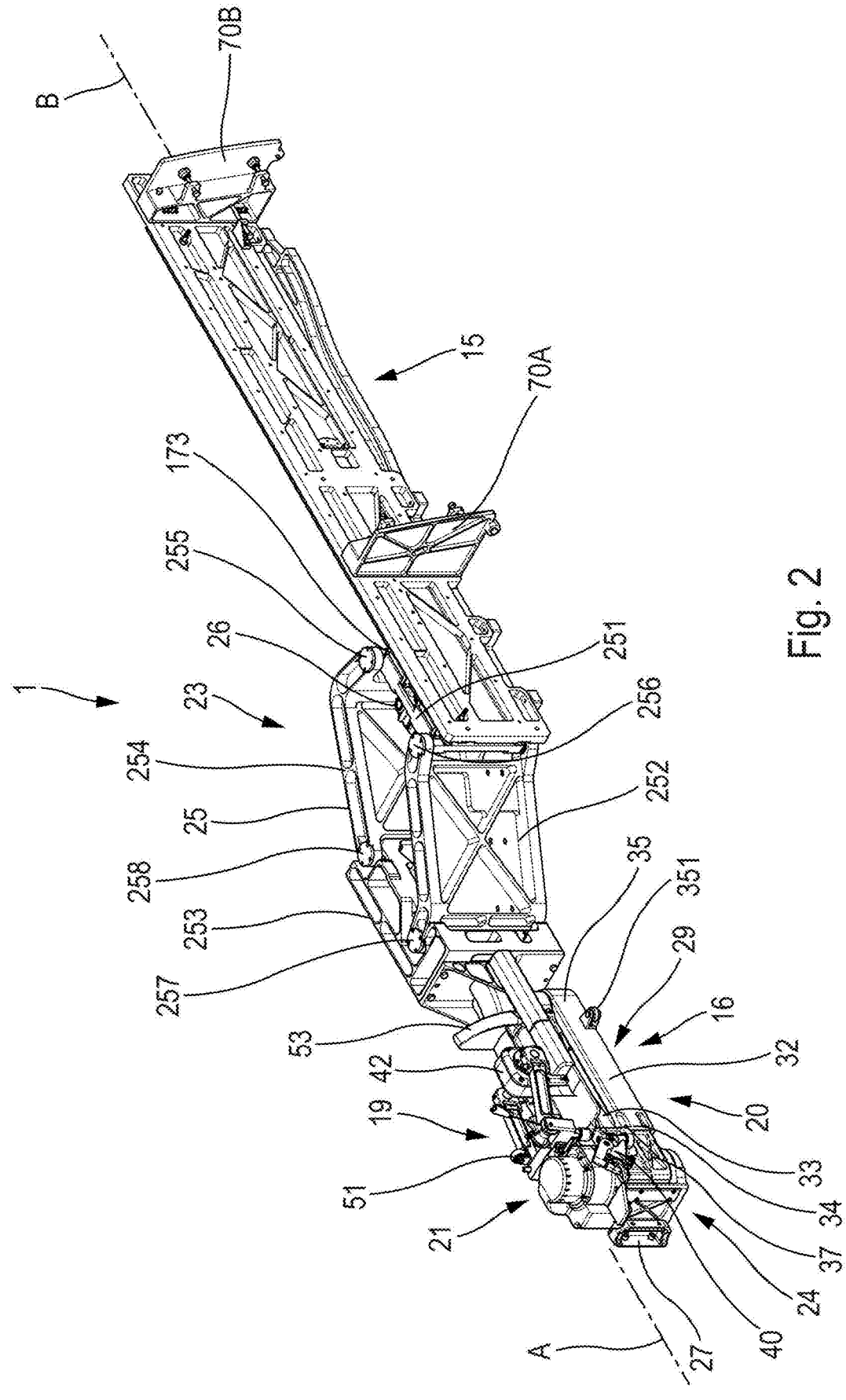
FIG. 2 represents a rear view in perspective of the system for automatic closure and opening in its extended position.

The system 1 for automatic and remote closure and opening is represented in FIG. 1 and FIG. 2. Hereinafter in the description, the system 1 for automatic and remote closure and opening will be known as the system 1.

Figure 12:
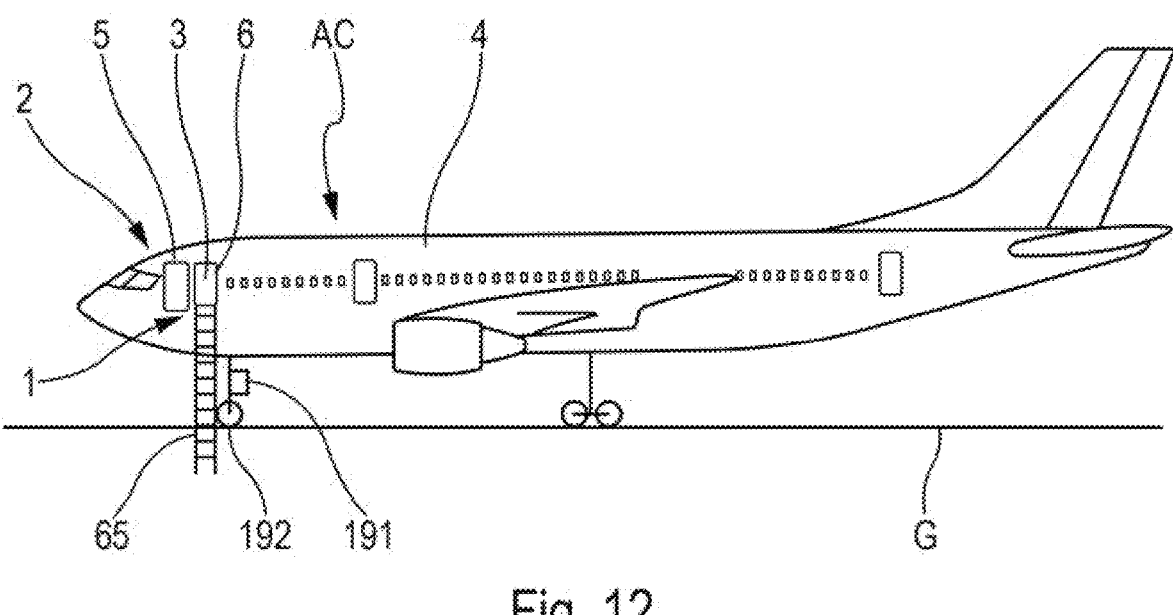
FIG. 12 represents a view of an aircraft comprising a system for automatic closure and opening.

The system 1 makes it possible alternately to close and open automatically and remotely a door 2 which is designed for an access opening 3 of a fuselage 4 of an aircraft AC. The access opening 3 can be accessible from the ground G by an access stair 65, which can or need not be incorporated in the aircraft AC (FIG. 12)

The door 2 comprises a leaf 5, a frame 6 and an articulation arm 7.

The frame 6 delimits the access opening 3. The frame 6 is secured integrally on the fuselage 4. The frame 6 has two parallel uprights 10 which are substantially vertical.

The adjective "vertical" corresponds to a direction perpendicular to the ground G when the aircraft AC is on the ground G.

The leaf 5 is configured to be alternately in a closed position, when the leaf 5 closes the access opening 3, and an open position when the leaf 5 leaves the access opening 3 open.

The articulation arm 7 comprises a first end 8 which is articulated on the leaf, and a second end 9 which is articulated on the frame, such that the leaf 5 remains parallel to itself when it goes from the open position to the closed position and vice versa (i.e., during the passage from the open position to the closed position).

Figure 11:
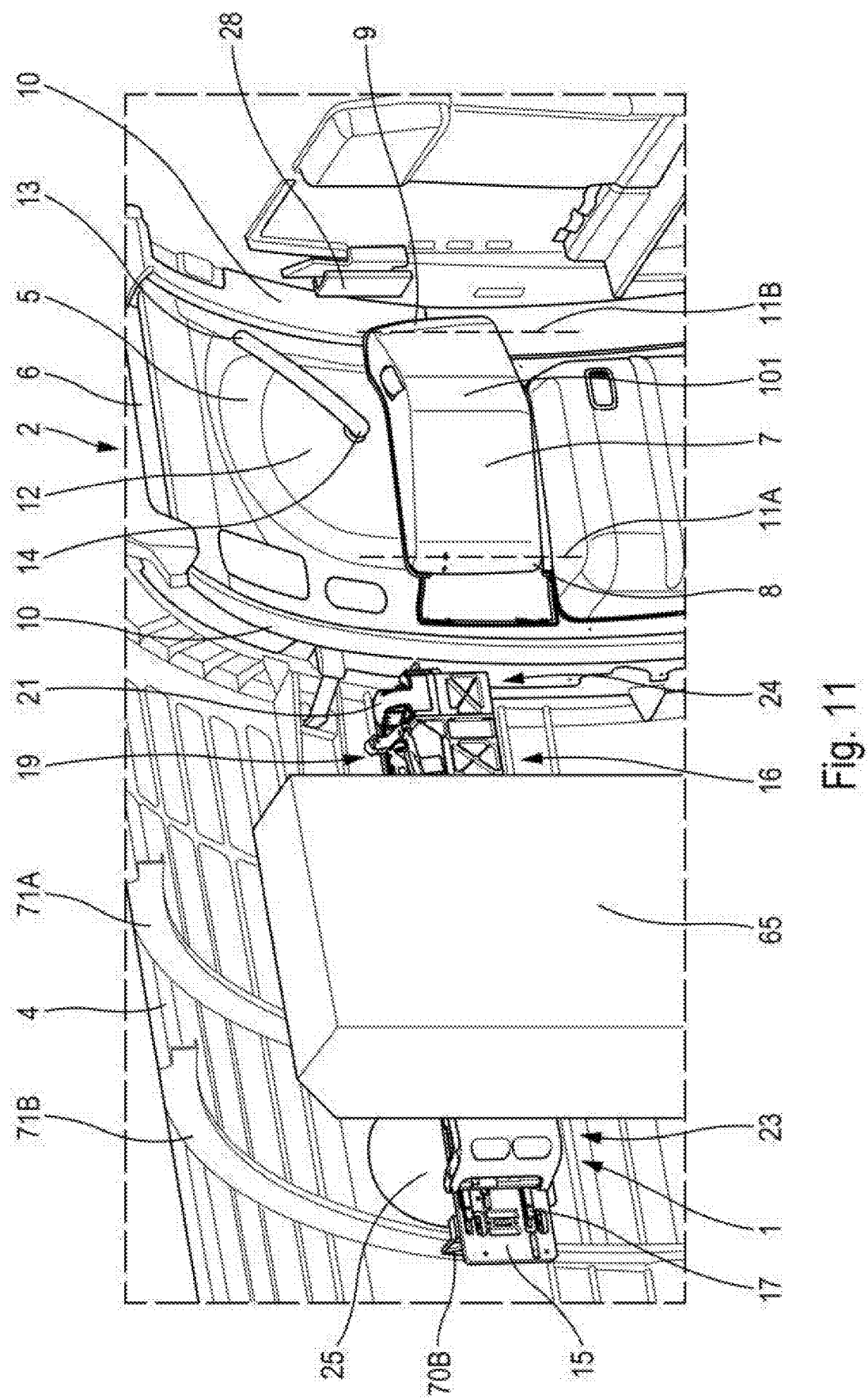
FIG. 11 represents a view in perspective of the system for automatic closure and opening in its position retracted behind an access stair.

For example, the first end 8 is articulated on the leaf 5 by a first vertical pivot connection 11A, and the second end 9 is articulated on the frame 6 by a second vertical pivot connection 11B (FIG. 11).

For example, the articulation arm 7 has substantially a form in the shape of a "V" according to a cross-section perpendicular to the vertical pivot connections 11A and 11B. The form in the shape of a "V" has two branches which correspond respectively to the first end 8 and the second end 9. The two branches of the "V" meet at a meeting point 101. In this example, the first vertical pivot connection 11A is situated at the end of the first end 8, and the second vertical pivot connection 11B is situated at the end of the second end 9.

The door 2 also comprises a locking mechanism 12, which is configured alternately to lock and unlock the leaf 5 when the leaf 5 is in the closed position. The locking mechanism 12 comprises a locking lever 13, an end 14 of which is fitted such as to rotate on the leaf 5 around an axis of rotation perpendicular to the leaf 5. The locking lever 13 is configured to be alternately in a locking position, in which the locking mechanism 12 locks the leaf 5, and an unlocking position in which the locking mechanism 12 does not lock the leaf 5.

The system 1 comprises at least one support 15, an elongate structure 16, a locking and unlocking device 19, a closure and opening device 20 and a control device 21.

Hereinafter in the description, in order to assist the reading, the closure and opening device 20 will be known as the closure device 20. The locking and unlocking device 19 will be known as the locking device 19.

The support 15 is designed to be secured integrally on the fuselage 4. The support 15 is designed to be secured in the interior of the fuselage 4. The support 15 thus makes it possible to secure the system 1 on the fuselage 4.

For example, the support 15 comprises securing plates 70A, 70B which are designed to be secured on frames 71A, 71B of the fuselage 4 (FIG. 1, FIG. 2, FIG. 11) in order to secure the support 15 on the fuselage 4.

The support 15 can be an elongate part with a longitudinal axis B.

The elongate structure 16 has a longitudinal axis A. In the case when the support is an elongate part along its longitudinal axis B, the longitudinal axis A is parallel to the longitudinal axis B (FIG. 1 and FIG. 2).

The elongate structure 16 is connected by a slide connection 17 to the support 15, such that the elongate structure 16 can be displaced in relation to the support 15 (and thus in relation to the fuselage 4) along its longitudinal axis A, perpendicularly to the two uprights 10 of the frame 6, when the system 1.

The slide connection 17 is configured such that the elongate structure 16 can be alternately in an extended position, in which the elongate structure 16 is facing the access opening 3, and in a retracted position of the elongate structure 16, in which the elongate structure 16 is not facing the access opening 3.

Advantageously, the system 1 is configured in order to be able to be inserted between the fuselage 4 and the access stair 65 retracted into the aircraft AC, when the system 1 is in its retracted position, as represented in FIG. 11.

Figure 9:
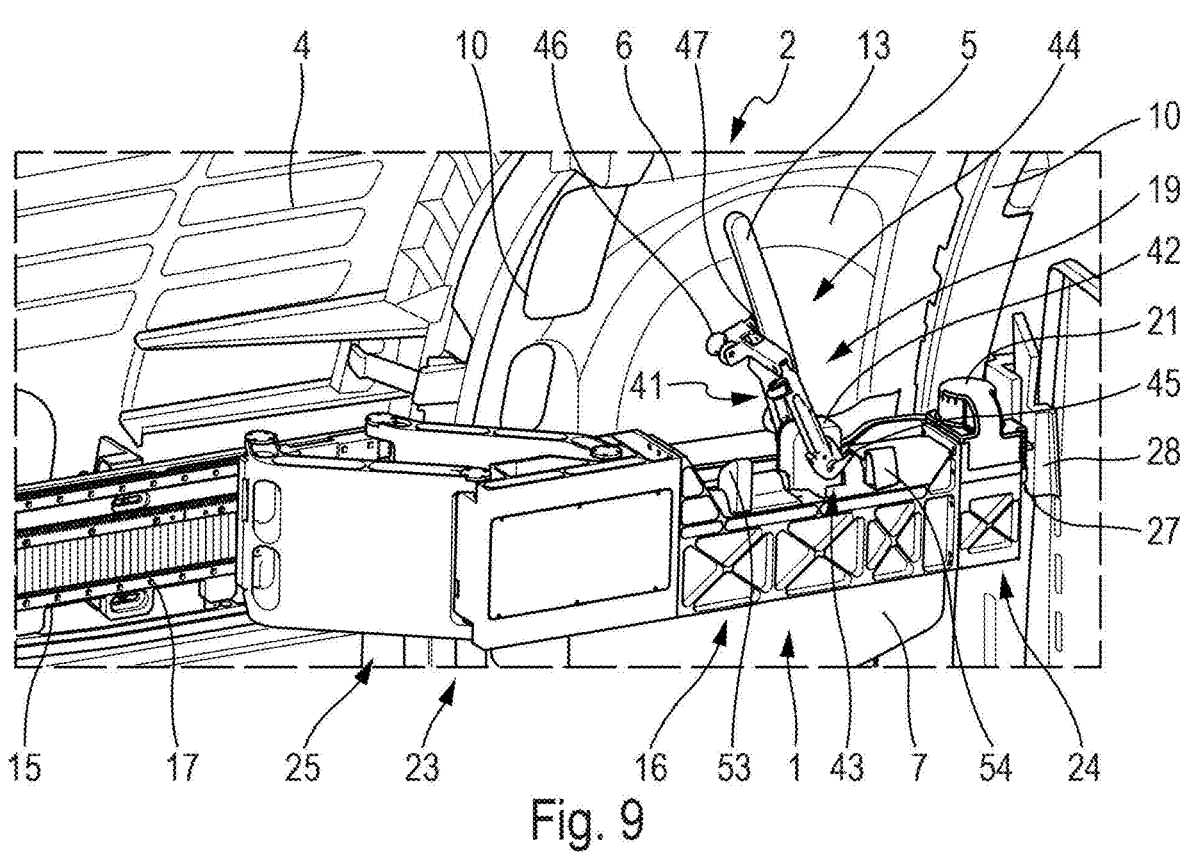
FIG. 9 represents a view in perspective of the system for automatic closure and opening during the locking of the locking lever.
Figure 10:
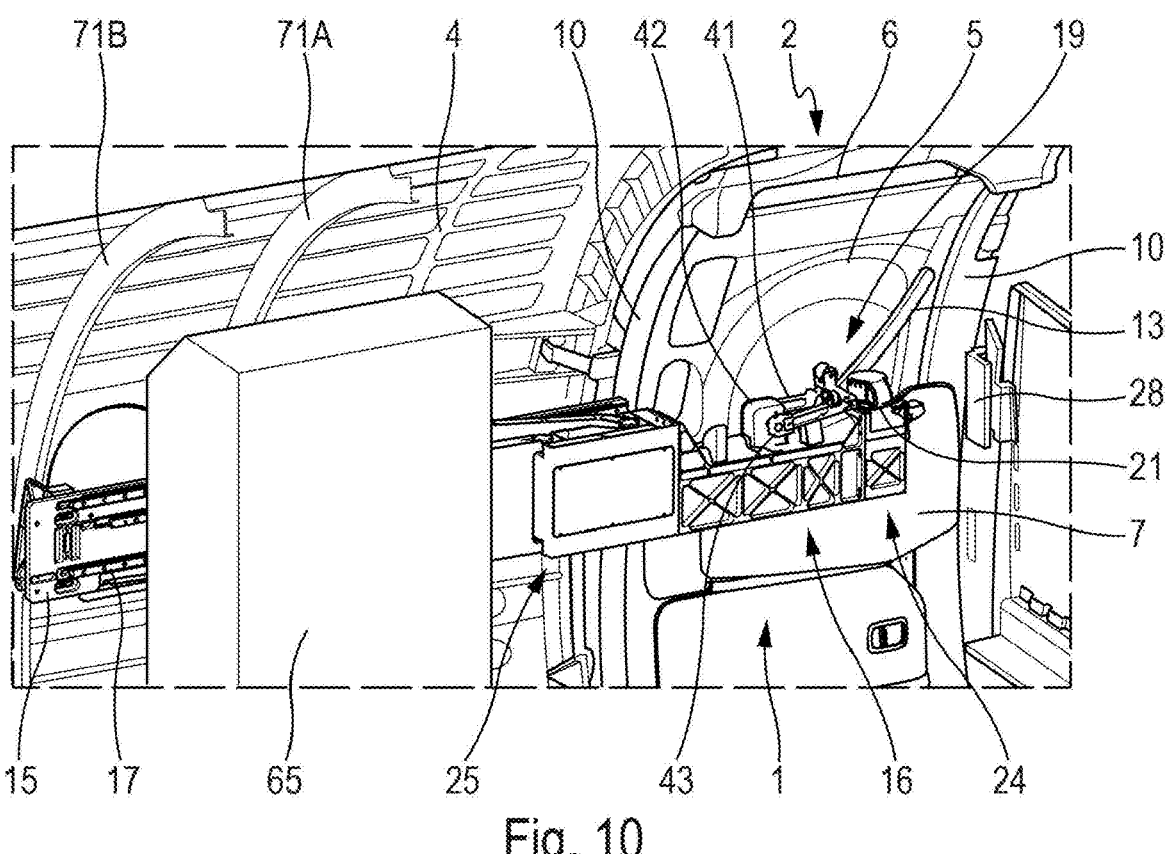
FIG. 10 represents a view in perspective of the system for automatic closure and opening after the locking of the locking lever.

The locking device 19 is fitted on the elongate structure 16. The locking device 19 is configured to bring the locking lever 13 alternately:

into the unlocking position, for unlocking of the leaf 5, when the elongate structure 16 is in its extended position (FIG. 4); and into the locking position for locking of the leaf 5, when the elongate structure 16 is in its extended position (FIG. 9 and FIG. 10).

According to one embodiment, the locking device 19 comprises a locking arm 41 and a fourth actuator 42. The locking arm 41 comprises a first end 43 and a second end 44. The first end 43 of the locking arm 41 is fitted such as to rotate on the elongate structure 16 by a third articulation 45.

Figure 4:
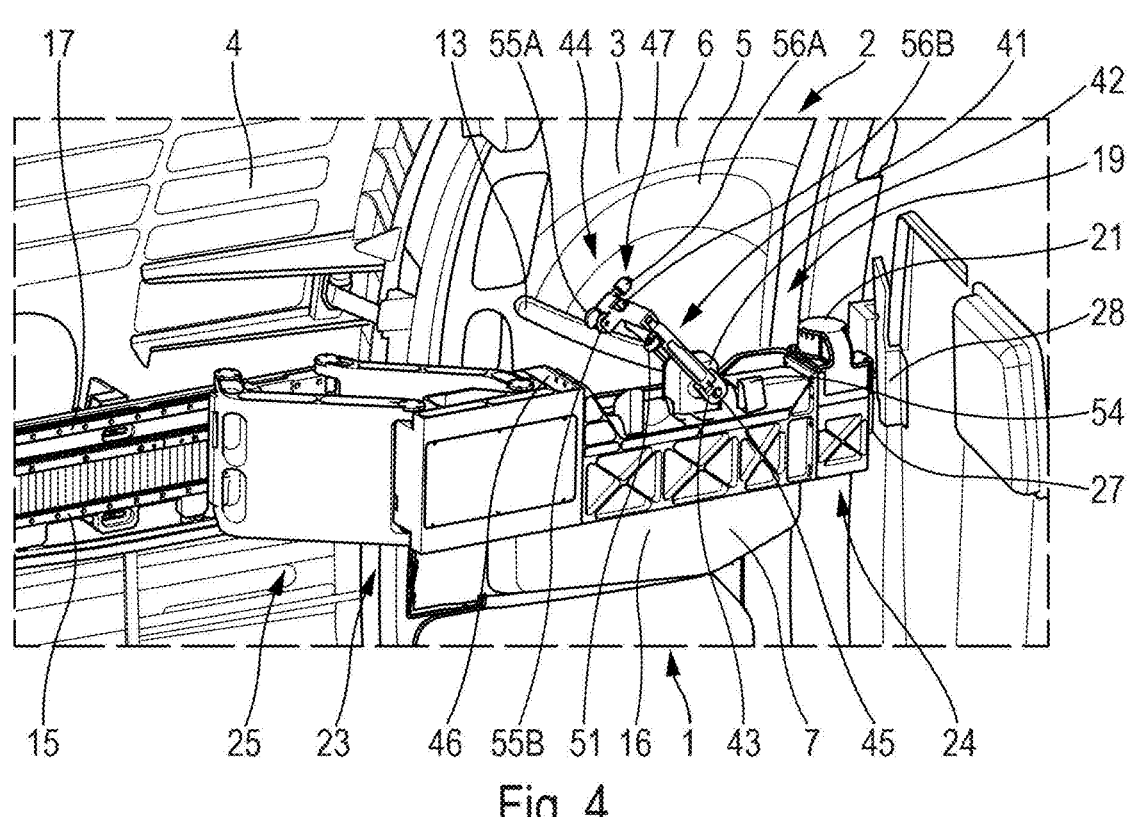
FIG. 4 represents a view in perspective of the system for automatic closure and opening during the unlocking of the locking lever.

The second end 44 of the locking arm 41 can comprise a first grasping device 46, which is designed to catch on the locking lever 13, in order for the locking arm 41 to drive the locking lever 13 from its looking position to its unlocking position (FIG. 4).

The second end 44 of the locking arm 41 can comprise a second grasping device 47 which is designed to catch on the locking lever 13, in order for the locking arm 41 to drive the locking lever 13 from its unlocking position to its locking position (FIG. 9).

The fourth actuator 42 can be configured to drive the locking arm 41 by rotation around the third articulation 45, between a retracted position and an extended position.

When the fourth actuator 42 drives the locking arm 41 from its retracted position to its extended position (FIG. 4), the locking arm 41 can drive the locking lever 13 from its locking position to its unlocking position, while the first grasping device 46 catches on the locking lever 13.

When the fourth actuator 42 drives the locking arm 41 from its extended position to its retracted position (FIG. 9), the locking arm 41 can drive the locking lever 13 from its unlocking position to its locking position, while the second grasping device 47 catches on the locking lever 13.

According to one embodiment, the locking arm 41 comprises a second deformable parallelogram mechanism 48. This second deformable parallelogram mechanism 48 comprises a first parallelogram side 49 corresponding to the first end 43 of the locking arm 41, and a second parallelogram side 50 parallel to the first side 49. The first side 49 of the parallelogram corresponds to the first end 43 of the locking arm 41. The second side 50 corresponds to the second end 44 of the locking arm 41. The second deformable parallelogram mechanism 48 is contained on a plane which is designed to be perpendicular to the leaf 5, meaning that the movements of rotation of the sides of the parallelogram are contained on a plane which is designed to be perpendicular to the leaf 5.

Advantageously, the locking arm 41 also comprises a first follower 51 and a second follower 52. The locking device 19 also comprises a first cam 53, fitted integrally on the elongate structure 16, and a second cam 54, fitted integrally on the elongate structure 16.

For example, the first cam 53 and the second cam 54 are positioned on both sides of the locking arm 41, along the longitudinal axis A (FIG. 9).

The first follower 51 is designed to cooperate with the first cam 53, in order for the second deformable parallelogram mechanism 48 to bring the first grasping device 46 facing the locking lever 13, before the locking arm 41 drives the locking lever 13 from its locking position to its unlocking position, while the first grasping device 46 is catching on the locking lever 13.

The second follower 52 is designed to cooperate with the second cam 54, in order for the second deformable parallelogram mechanism 48 to bring the second grasping device 47 facing the locking lever 13, before the locking arm 41 drives the locking lever 13 from its unlocking position to its locking position, while the second grasping device 47 is catching on the locking lever 13.

According to one embodiment, the first grasping device 46 can comprise two rollers 55A, 55B (FIG. 3, FIG. 4, FIG. 8), which are designed to catch on the locking lever 13 by receiving the locking lever 13 between the two rollers 55A, 55B, when the locking arm 41 drivers the locking lever 13 from its locking position to its unlocking position. The rollers 55A and 55B make it possible to prevent friction between the locking lever 13 and the first grasping device 46, when the first grasping device 46 drives the locking lever 13.

The second grasping device 47 can comprise two rollers 56A, 56B (FIG. 4), which are designed to catch on the locking lever 13, when the locking arm 41 drives the locking lever 13 from its locking position to its unlocking position. The rollers 56A and 56B make it possible to prevent friction between the locking lever 13 and the second grasping device 47, when the second grasping device 47 drives the locking lever 13.

Figure 8:
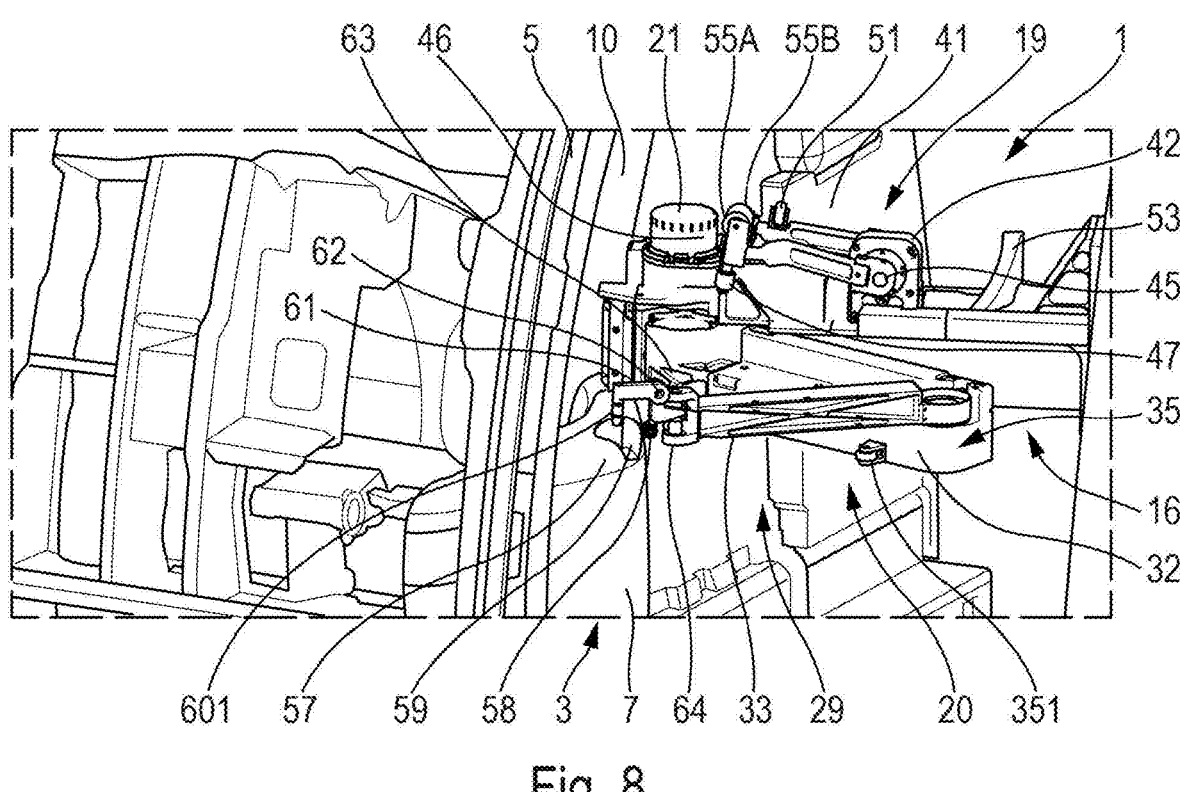
FIG. 8 represents a view in perspective of a detail of the device for closure and opening of the system before closure of the leaf when the hook is catching on the element for blocking of the leaf.

The closure device 20 is also fitted on the elongate structure 16. The closure device 20 is configured alternately:

to thrust the articulation arm 7, in order to bring the leaf 5 to the open position, when the elongate structure 16 is in its extended position (FIG. 5); and to catch on the articulation arm 7, then to draw the articulation arm 7, in order to bring the leaf 5 to the closed position, when the elongate structure 16 is in its extended position (FIG. 8).

The closure device 20 can comprise an articulated arm 29, a second actuator 30, and a third actuator 31.

The articulated arm 29 has a first segment 32 which can be actuated by the second actuator 30, according to control orders sent by the control device 21 (FIG. 5, FIG. 6, FIG. 7, FIG. 8). The articulated arm 29 also has a second segment 33 which can be actuated by the third actuator 31, according to control orders sent by the control device 21.

Figure 5:
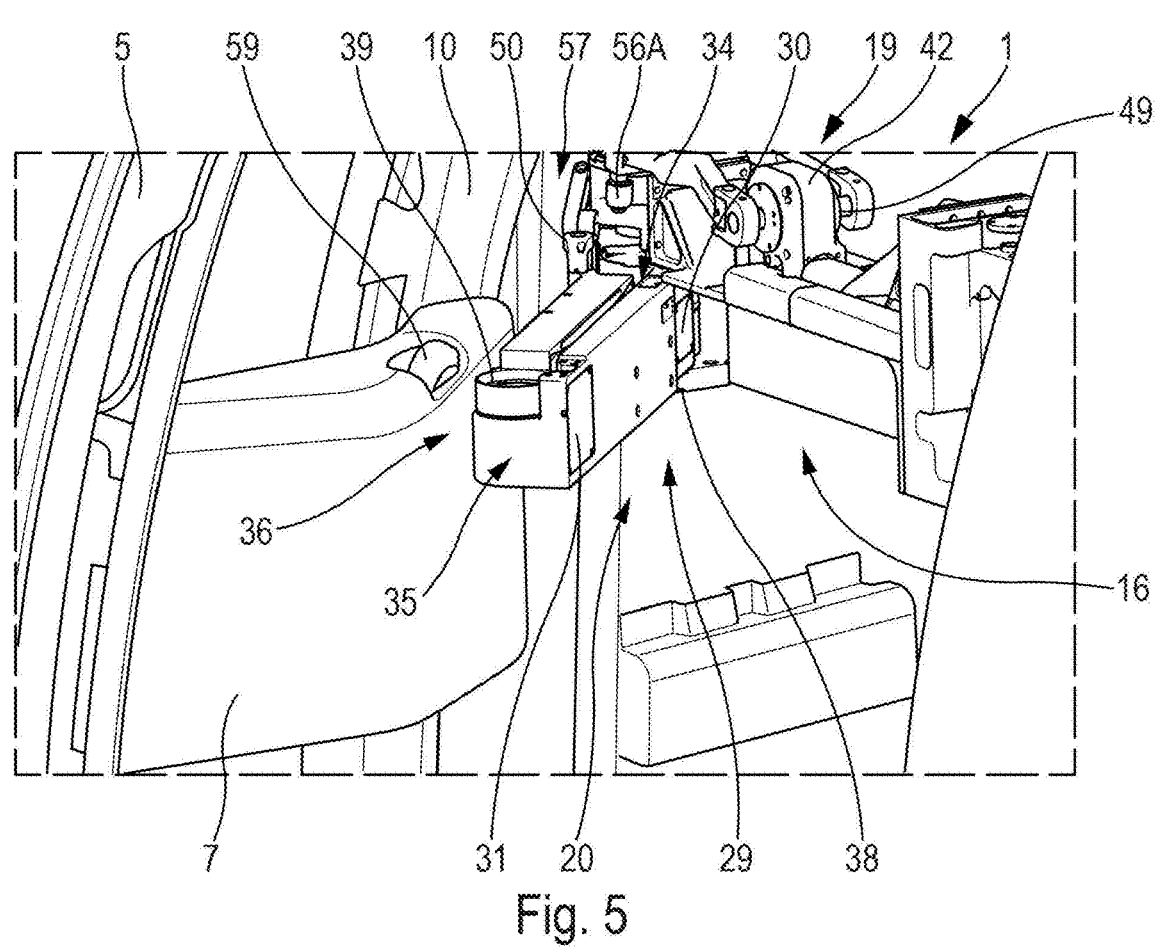
FIG. 5 represents a view in perspective of a detail of the device for closure and opening of the system during opening of the leaf.

The first segment 32 is designed to be actuated by the second actuator 30, in order to thrust the articulation arm 7, so as to bring the leaf 5 towards the open position, when the elongate structure 16 is in its extended position (FIG. 5).

The second segment 33 is designed to be actuated by the third actuator 31, in order to catch on the articulation arm 7, then to draw the articulation arm 7 so as to bring the leaf 5 towards the closed position (of the leaf 5), when the elongate structure 16 is in its extended position (FIG. 8).

The first segment 32 comprises a first end 34 and a second end 35. The second segment 33 comprises a first end 36 and a second end 37.

Figure 6:
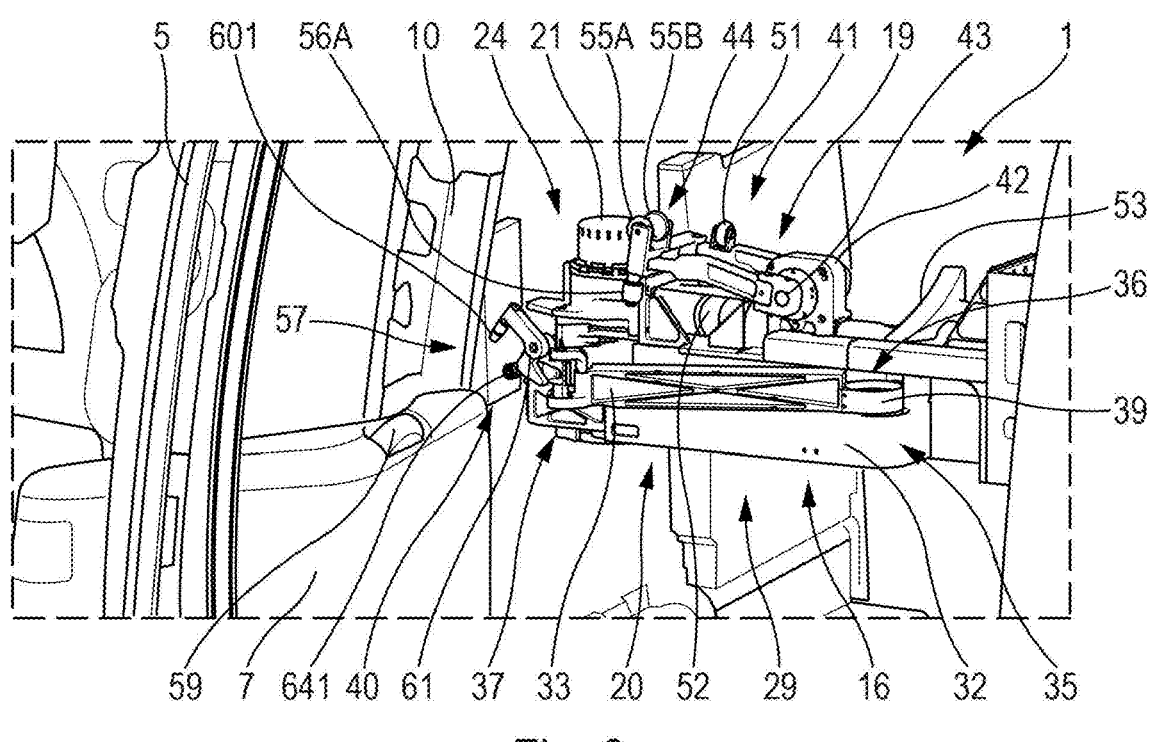
FIG. 6 represents a view in perspective of a detail of the device for closure and opening of the system before closure of the leaf.

According to one embodiment, the first end 34 of the first segment 32 is fitted on the elongate structure 16 by a first articulation 38. The first articulation 38 is configured to permit rotation of the first segment 32 on a plane perpendicular to the two uprights 10 of the frame 6, between a retracted position of the first segment 32, and an extended position of the first segment 32. The retracted position of the first segment 32 corresponds to a position in which the first segment 32 is retracted against the elongate structure 16 (FIG. 6). The second position of the first segment 32 corresponds to a position in which the leaf 5 is in its open position by the support of the second end 35 of the first segment 32 against the articulation arm 7 after passage from the retracted position of the first segment 32 to the extended position of the first segment 32 (FIG. 5).

Advantageously, the second end 35 of the first segment 32 comprises a roller 351 (FIG. 2, FIG. 7 and FIG. 8) which is designed to be supported against the articulation arm 7. The roller 351 makes it possible to prevent friction between the second end 35 of the first segment 32 and the articulation arm 7 during the opening of the leaf 5.

The second actuator 30 can be configured to rotate the first segment 32 around the first articulation 38:

in order to bring the first segment 32 from its retracted position to its extended position; and in order to bring the first segment 32 from its extended position to its retracted position.

The second end 35 of the first segment 32 can be fitted on the first end 36 of the second segment 33 by a second articulation 39.

Advantageously, the second end 37 of the second segment 33 comprises a catching element 40. The second articulation 39 is configured to permit rotation of the second segment 33 on a plane perpendicular to the two uprights 10 of the frame 6, between a retracted position of the second segment 33, and an extended position of the second segment 33. The retracted position of the second segment 33 corresponds to a position in which the second segment 33 is retracted against the first segment 32 (FIG. 5). The second position of the second segment 33 corresponds to a position in which the catching element 40 catches on the articulation arm 7 (FIG. 8). The third actuator 31 is configured to rotate the second segment 33 around the first articulation 38:

in order to bring the second segment 33 from its retracted position to its extended position; and in order to bring the second segment 33 from its extended position to its retracted position, by drawing the articulation arm 7 until the leaf 5 is in its closed position.

Figure 7:
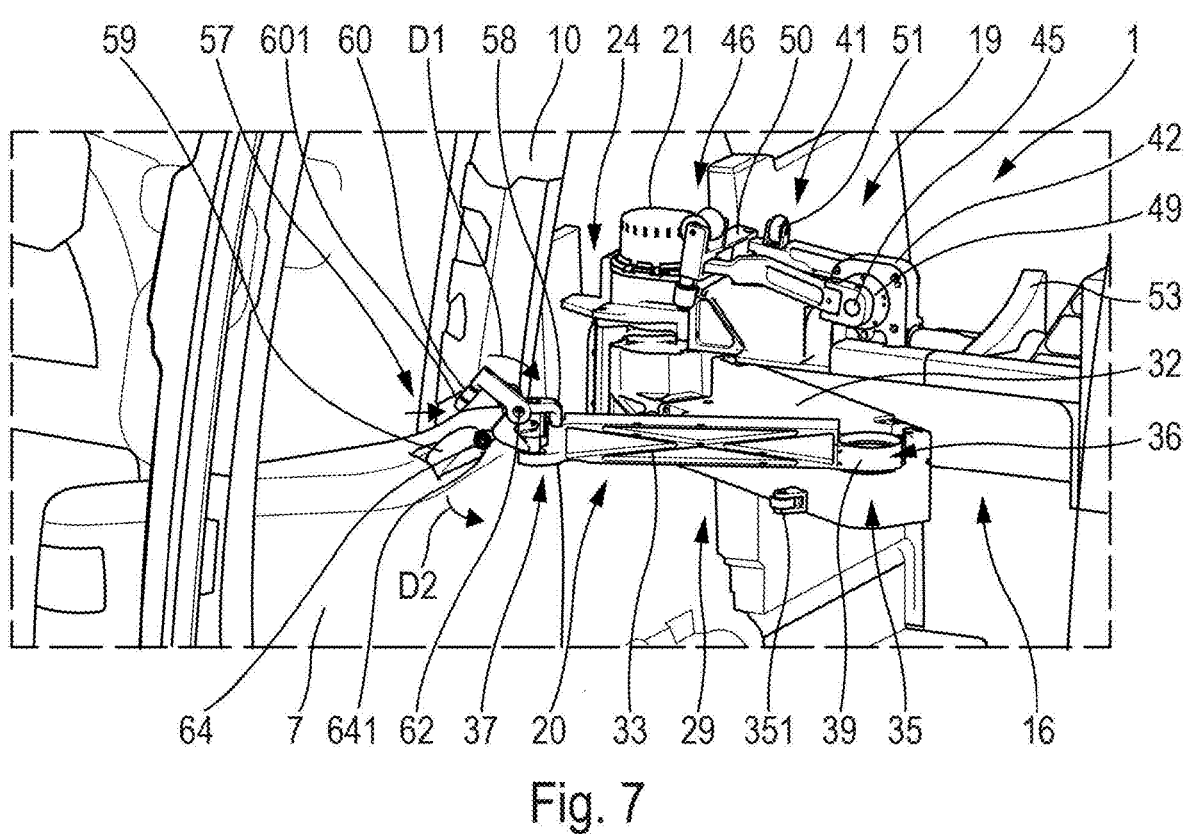
FIG. 7 a view in perspective of a detail of the device for closure and opening of the system before closure of the leaf when the hook is approaching the element for blocking of the leaf.

In addition, the second actuator 30 can also be configured to rotate the first segment 32 around the first articulation 38, while the third actuator 31 rotates the second segment 33 around the first articulation 38, in order to bring the second segment 33 from its retracted position to its extended position, and in order to bring the second segment 33 from its extended position to its retracted position, by drawing the articulation arm 7 until the leaf 5 is in its closed position (FIG. 7, FIG. 8).

According to one embodiment, the catching element 40 comprises a hook 57, which is fitted such as to rotate on the second end 37 of the second segment 33, by a fourth articulation 58 (FIG. 7). The fourth articulation 58 permits rotation of the hook 57 parallel to the first segment 32 and to the second segment 33. The hook 57 is designed to catch on a blocking element 59, which is designed to block the leaf 5 in its open position, after opening of the leaf 5 (FIG. 8).

The hook 57 is also designed to draw the blocking element 59, in order to draw the articulation arm 7, so as to bring the leaf 5 to its closed position.

The blocking element 59 can correspond to a locking finger which is locked automatically in order to block the leaf 5 in its open position, when the leaf 5 is brought to the open position. Habitually, in order to unlock the locking finger (and thus to unblock the leaf 5), a user acts manually on the blocking element 59, in order to unlock the locking finger. The hook 57 makes it possible to act on the blocking element 59, by drawing it in order to unlock the locking finger from the blocking element 59.

The hook 57 has a first free end 60, and a second end 61 which is fitted such as to rotate on the fourth articulation 58, by a fifth articulation 62. The fifth articulation 62 permits rotation of the hook 57 perpendicularly to the first segment 32 and to the second segment 33.

Advantageously, the hook 57 comprises a resilient element 63, which tends to rotate the hook 57 in a first direction of rotation D1 (the direction of rotation of which is represented in FIG. 7 by the arrow D1), around the fifth articulation 62, such that the hook 57 is in an unhooking position. The unhooking position corresponds to a position of the hook 57 in which the first end 60 of the hook 57 cannot catch on the blocking element 59, when the second segment 33 is brought from its retracted position to its extended position. The resilient element can correspond to a helical spring.

The second end 61 of the hook 57 comprises a finger 64 which is designed to be supported against the blocking element 59, when the second segment 33 has reached its extended position. The support of the finger 64 against the blocking element 59 can rotate the hook 57 in a second direction of rotation D2 (the direction of rotation of which is represented in FIG. 7 by the arrow D2), which is the inverse of the first direction of rotation D1 by the fifth articulation 62, until the hook 57 is in a catching position (FIG. 7 and FIG. 8). The catching position corresponds to a position of the hook 57 in which the first end 60 of the hook 57 catches on the blocking element 59.

The resilient element 63 can drive the hook 57 from its catching position to its unhooking position, when the first end 60 of the hook 57 is no longer drawing the articulation arm 7 (or is no longer drawing the blocking element 59), and when the finger 64 is no longer supported against the blocking element 59.

Advantageously, the finger 64 comprises a roller 641 (FIG. 6, FIG. 7), which is designed to be supported against the blocking element 59. The roller 641 makes it possible to prevent friction between the fingers 64 and the blocking element 59, while the hook 57 is rotating at least in the second direction of rotation D2. In addition, the first end 60 of the hook 57 can comprise a roller 601 (FIG. 6, FIG. 7, FIG. 8), which is designed to draw the blocking element 59. The roller 601 makes it possible to avoid friction between the first end 60 of the hook 57 and the blocking element 59, while the hook 57 is drawing the blocking element 59 in order to close the leaf 5.

The control device 21, for its part, is configured to transmit:
  orders to command closure or opening of the leaf 5 to the closure device 20; and
  orders to command locking or unlocking to the locking device 19.

For example, the control device 21 can be secured in the interior of the aircraft AC.

The orders to command closure of the leaf 5, and opening of the leaf 5, and the orders to command locking and unlocking, are transmitted by the control device 21 according to control orders transmitted remotely by a user to the control device 21.

The control device 21 can receive control orders from the user of a man-machine interface 191. A user can control firstly closure and locking of the leaf 5, or secondly unlocking and opening of the leaf 5 via the man-machine interface 191. The man-machine interface 191 can correspond to a physical or virtual keyboard. For example, the keyboard can comprise a physical or virtual button making it possible to send to the control device 21 an order to command closure and locking of the leaf 5 when the user presses this button. The keyboard can also comprise a physical or virtual button making it possible to send to the control device 21 an order to command unlocking and opening of the leaf 5 when the user presses this button. According to one or the other of the command orders which the control device 21 receives from the man-machine interface 191, it transmits orders to command closure or orders to command opening of the leaf 5 to the closure device 20, and orders to command locking or orders to command unlocking of the leaf 5 to the locking device 19. Advantageously, the man-machine interface 191 is fitted on a part of the aircraft AC which is easily accessible to a user on the ground G. For example it is fitted on the front undercarriage 192 (FIG. 12). It can also be detachable from the aircraft AC. The man-machine interface 191 can also comprise the physical or virtual buttons which permit the deployment or retraction of the access stair 65. In addition, the man-machine interface 191 can comprise a display device, such as a screen or light-up signals. The display device can indicate to the user the confirmation of the closure and locking of the leaf 5, or also the opening of the leaf 5. For example, if the control device 21 transmits to the man-machine interface a signal of confirmation of closure (and of locking) of the leaf 5, a light-up signal is activated (switched on). If the control device 21 transmits to the man-machine interface a signal of confirmation of opening of the leaf 5, another light-up signal is activated. The signals which are exchanged between the man-machine interface 191 and the control device 21, such as the command orders, can be transmitted by a wired or a wireless connection.

The system 1 can comprise a first actuator 26 which is configured to actuate the slide connection 17. The actuation of the slide connection 17 can drive the elongate structure 16 alternately towards its extended position and towards its retracted position.

By way of non-limiting example, the slide connection 17 can be produced by rails 171 and a rack device 172 (FIG. 1). The elongate structure 16 is then guided by the rails 171 when it is driven by the rack device 172.

The elongate structure 16 has a first longitudinal end 23.

The first longitudinal end 23 can comprise a first deformable parallelogram mechanism 25 fitted on the slide connection 17.

The first deformable parallelogram mechanism 25 is configured to be alternately in an extended position and an extended position. The first deformable parallelogram mechanism 25 is in its extended position when the elongate structure 16 is in its extended position. The first deformable parallelogram mechanism 25 is in its retracted position when the elongate structure 16 is in its retracted position.

The first deformable parallelogram mechanism 25 is configured to maintain the elongate structure 16 parallel to the leaf 5 when the elongate structure 16 goes from its retracted position to its extended position, and vice versa. In other words, the first deformable parallelogram mechanism 25 makes it possible to maintain the longitudinal axis A substantially parallel to the fuselage 4, and perpendicular to the two uprights 10 of the frame 6. It also allows the system 1 to be able to be inserted between the fuselage 4 and the access stair 65 when the system is in its retracted position, as represented in FIG. 11.

For example, the first deformable parallelogram mechanism 25 can comprise at least four rigid elements 251, 252, 253, 254, which are connected to one another at their ends by four pivot connections 255, 256, 257, 258. A rigid element 251 comprises at least one slide 173 which cooperates with rails 171. Another rigid element 253, opposite in the parallelogram to the rigid element 251, is secured on the elongate structure 16 in the extension of the longitudinal axis A (FIG. 1 and FIG. 2).

The driving of the elongate structure 16, alternately to its extended position and to its retracted position, brings the first deformable parallelogram mechanism 25 from its retracted position to its extended position, and vice versa, respectively.

The elongate structure 16 has a second longitudinal end 24.

The second longitudinal end 24 can comprise a first securing element 27, which is designed to be secured on a second securing element 28, when the elongate structure 16 is in its extended position. The second securing element 28 is fitted integrally on the fuselage 4. When the first securing element 27 is secured on the second securing element 28, the elongate structure 16 does not remain cantilevered when the elongate structure 16 is in its extended position. When the elongate structure 16 returns to its retracted position, the first securing element 27 is designed to be detached from the second securing element 28.

Figure 3:
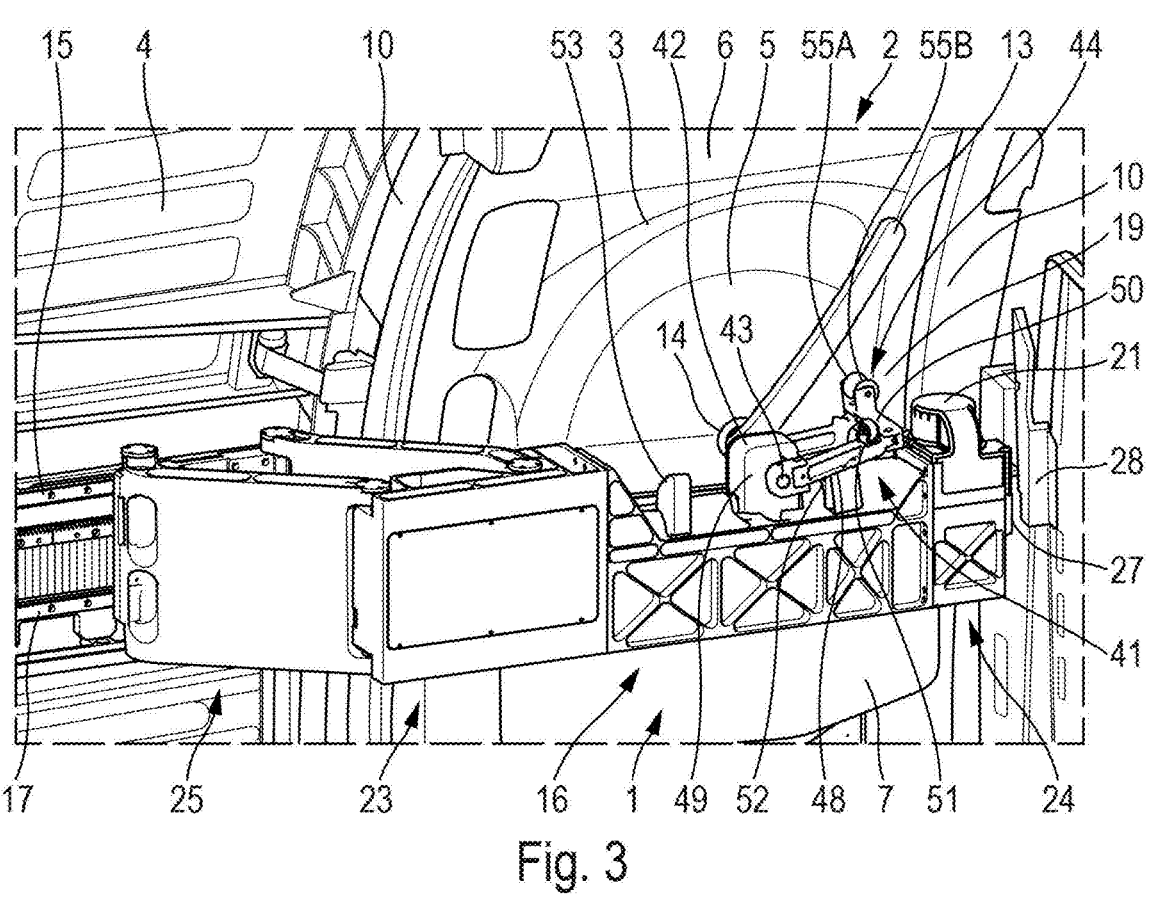
FIG. 3 represents a view in perspective of the system for automatic closure and opening before unlocking of the locking lever.

According to one embodiment, the system 1 can comprise the second securing element 28, as represented in FIG. 3. According to another embodiment, the second securing element 28 can correspond to an element of the fuselage 4.

By way of non-limiting example, the first securing element 27 comprises fingers, and the second securing element 28 comprises orifices. Each of the orifices faces each of the fingers when the elongate structure 16 approaches its extended position. Each of the fingers is then inserted in a respective orifice, when the elongate structure 16 is in its extended position. In this example, the first securing element 27 is secured on the second securing element 28 when the fingers are inserted in the orifices.

Figure 13:
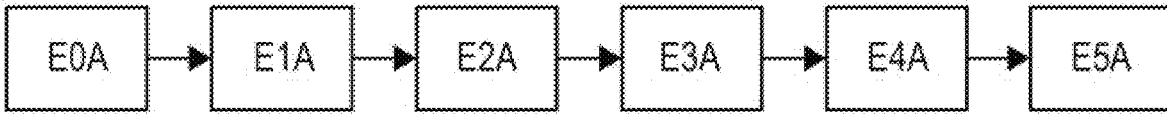
FIG. 13 represents the closure method schematically.

The invention also concerns a method for automatic closure of the leaf 5 by implementation of the system for closure and opening 1 (FIG. 13).

The closure method comprises the following steps:
a step E1A of extension, in which the elongate structure 16 is brought from its retracted position to its extended position by the slide connection 17;
a step E2A of catching, in which the device for closure and opening 20 catches on the articulation arm 7;
a step E3A of closure, in which the device for closure and opening 20 draws the articulation arm 7, in order to bring the leaf 5 towards its closed position;
a step E4A of locking, in which the device for locking and unlocking 19 brings the locking lever 13 into the locking position, for locking of the leaf 5.

The step E1A of extension, the step E2A of catching, and the step E3A of closure are implemented after a step EOA of receipt by the control device 21 of orders to command closure transmitted remotely by a user. The step E4A of locking is implemented after receipt of orders to command locking from the control device 21.

The closure method can also comprise a step E5A of retraction, in which the elongate structure 16 is brought from its extended position to its retracted position by the slide connection 17. The step E5A of retraction follows the step E4A of locking.

Figure 14:
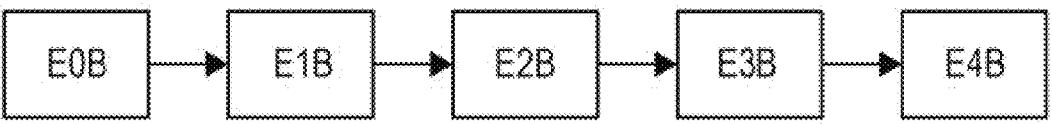
FIG. 14 represents the opening method schematically.

The invention also concerns a method for automatic opening of the leaf 5 by implementation of the system for closure and opening 1 (FIG. 14).

The opening method comprises the following steps:
a step E1B of extension, in which the elongate structure 16 is brought from its retracted position to its extended position by the slide connection 17;
a step E2B of unlocking, in which the locking and unlocking device 19 brings the locking lever 13 into the unlocking position for unlocking of the leaf 5;
a step E3B of opening, in which the device for closure and opening 20 thrusts the articulation arm 7, in order to bring the leaf 5 towards its open position.

The step E1B of extension, the step E2B of unlocking, and the step E3B of opening are implemented after a step EOB of receipt by the control device 21 of orders to command opening transmitted remotely by a user.

The opening method can also comprise a step E4B of retraction, in which the elongate structure 16 is brought from its extended position to its retracted position by the slide connection 17. The step E4B of retraction follows the step E3B of opening.

The systems and devices described herein may include a controller or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for automatic and remote closure and opening of a door designed for an access opening of an aircraft (AC) fuselage, the door comprising a leaf, a frame delimiting the access opening and an articulation arm, the frame being secured integrally on the fuselage and having two uprights, the leaf configured to be alternately in a closed position, when the leaf closes the access opening, and an open position, when the leaf leaves the access opening open, with the articulation arm comprising a first end articulated on the leaf, and a second end articulated on the frame, such that the leaf remains parallel to itself when the leaf changes from the open position to the closed position and from the closed position to the open position, the door also comprising a locking mechanism which is configured alternately to lock and unlock the leaf when the leaf is in the closed position, the locking mechanism comprising a locking lever, an end of which is fitted such as to rotate on the leaf around an axis of rotation perpendicular to the leaf, the locking lever being configured to be alternately in a locking position, in which the locking mechanism locks the leaf, and an unlocking position, in which the locking mechanism does not lock the leaf, the system comprising:

a support designed to be secured integrally on the fuselage;

an elongate structure having a longitudinal axis, the elongate structure connected with a slide connector on the support, such that the elongate structure is configured to be displaced relative to the support along a longitudinal axis perpendicularly to the two uprights of the frame, the slide connection being configured such that the elongate structure is configured to alternately be in an extended position in which the elongate structure is facing the access opening, and in a retracted position of the elongate structure, in which the elongate structure is not opposite the access opening;

a locking and unlocking device fitted on the elongate structure, the locking and unlocking device configured to bring the locking lever alternately into the unlocking position, for unlocking of the leaf when the elongate structure is in the extended position, and into the locking position for locking of the leaf when the elongate structure is in the extended position;

a closure and opening device fitted on the elongate structure, the closure and opening device configured alternately to thrust the articulation arm in order to bring the leaf towards the open position, when the elongate structure is in the extended position, and to catch on the articulation arm, then to draw the articulation arm in order to bring the leaf towards the closed position, when the elongate structure is in the extended position; and, a control device configured to transmit orders to command closure or opening of the leaf to the closure and opening device, and orders to command locking or unlocking to the locking and unlocking device, according to command orders transmitted remotely to the control device by a user.

2. The system according to claim 1, further comprising:
a first actuator configured to actuate the slide connection.

3. The system according to claim 1, wherein the elongate structure has a first longitudinal end, the first longitudinal end comprising a first deformable parallelogram mechanism fitted on the slide connection, the first deformable parallelogram mechanism configured to be in an extended position when the elongate structure is in the extended position, the first deformable parallelogram mechanism configured to be in a retracted position when the elongate structure is in the retracted position, the first deformable parallelogram mechanism configured to maintain the elongate structure parallel to the leaf, when the elongate structure spans from the retracted position to the extended position, and from the extended position to the retracted position.

4. The system according to claim 1, wherein the elongate structure has a second longitudinal end, the second longitudinal end comprising a first securing element which is configured to be secured on a second securing element which is fitted integrally with the fuselage when the elongate structure is in the extended position.

5. The system according to claim 1, wherein the closure and opening device comprises an articulated arm, a second actuator, and a third actuator, the articulated arm having a first segment which is configured to be actuated by the second actuator according to control orders sent by the control device, and a second segment which is configured to be actuated by the third actuator according to control orders sent by the control device, the first segment configured to be actuated by the second actuator, in order to thrust the articulation arm so as to bring the leaf towards the open position when the elongate structure is in the extended position, the second segment configured to be actuated by the third actuator, in order to catch on the articulation arm, then to draw the articulation arm so as to bring the leaf towards the closed position when the elongate structure is in the extended position.

6. The system according to claim 5, wherein the first segment comprises a first end and a second end, the second segment comprising a first end and a second end, the first end of the first segment fitted on the elongate structure with a first articulation, the first articulation configured to permit rotation of the first segment on a plane perpendicular to the two uprights of the frame, between a retracted position of the first segment and an extended position of the first segment, the retracted position of the first segment corresponding to a position in which the first segment is retracted against the elongate structure, the extended position of the first segment corresponding to a position in which the leaf is in a position opened by the support of the second end of the first segment after passage from the retracted position of the first segment to the extended position of the first segment, the second actuator configured to rotate the first segment around the first articulation:

in order to bring the first segment from the retracted position to the extended position, and in order to bring the first segment from the extended position to the retracted position;

the second end of the first segment fitted on the first end of the second segment by a second articulation, the second end of the second segment comprising a catching element, the second articulation configured to permit rotation of the second segment on a plane perpendicular to the two uprights of the frame, between a retracted position of the second segment and an extended position of the second segment, the retracted position of the second segment corresponding to a position in which the second segment is retracted against the first segment, the extended position of the second segment corresponding to a position in which the catching element catches on the articulation arm, the third actuator configured to rotate the second segment around the first articulation:

in order to bring the second segment from the retracted position to the extended position, and in order to bring the second segment from the extended position to the retracted position by drawing the articulation arm until the leaf is in the closed position.

7. The system according to claim 6, wherein the second actuator is further configured to rotate the first segment around the first articulation while the third actuator rotates the second segment around the first articulation, in order to bring the second segment from the retracted position to the extended position, and to bring the second segment from the extended position to the retracted position, by drawing the articulation arm until the leaf is in the closed position.

8. The system according to claim 6, wherein the catching element comprises a hook which is fitted so as to rotate on the second end of the second segment by a fourth articulation, with the fourth articulation permitting rotation of the hook parallel to the first segment and to the second segment, the hook configured to catch on a blocking element which blocks the leaf in the open position after opening of the leaf, the hook also drawing the blocking element in order to draw the articulation arm so as to bring the leaf to the closed position, the hook having a first free end and a second free end which is fitted such as to rotate on the fourth articulation by a fifth articulation, the fifth articulation permitting rotation of the hook perpendicularly to the first segment and the second segment, the hook further comprising a resilient element which tends to rotate the hook in a first direction of rotation around the fifth articulation, such that the hook is in an unhooking position, the unhooking position corresponding to a position of the hook in which the first end of the hook cannot catch on the blocking element when the second segment is brought from the retracted position to the extended position, the second end of the hook comprising a finger which is configured to be supported against the blocking element when the second segment has reached the extended position, the support of the finger against the blocking element being liable to rotate the hook in a second direction of rotation which is the inverse of the first direction of rotation via the fifth articulation, until the hook is in a catching position, the catching position corresponding to a position of the hook in which the first end of the hook catches on the blocking element, the resilient element driving the hook from the catching position to the unhooking position, when the first end of the hook is no longer drawing the articulation arm, and when the finger is no longer supported against the blocking element.

9. The system according to claim 1, wherein the locking and unlocking device comprises a locking arm and a fourth actuator, the locking arm comprising a first end and a second end, the first end of the locking arm fitted such as to rotate on the elongate structure by a third articulation, the second end of the locking arm comprising a first grasping device configured to catch on the locking lever such that the locking arm drives the locking lever from the locking position to the unlocking position, the second end of the locking arm comprising a second grasping device configured to catch on the locking lever such that the locking arm drives the locking lever from the unlocking position to the locking position, the fourth actuator configured to drive the locking arm by rotation around the third articulation between a retracted position and an extended position, when the fourth actuator drives the locking arm from the retracted position to the extended position, the locking arm drives the locking lever from the locking position to the unlocking position, while the first grasping device catches on the locking lever, when the fourth actuator drives the locking arm from the extended position to the retracted position, the locking arm drives the locking lever from the unlocking position to the locking position while the second grasping device catches on the locking lever.

10. The system according to claim 9, wherein the locking arm comprises a second deformable parallelogram mechanism, the second deformable parallelogram mechanism comprising a first parallelogram side corresponding to the first end of the locking arm, and a second parallelogram side parallel to the first side, the second side corresponding to the second end of the locking arm, the second deformable parallelogram mechanism contained on a plane which is perpendicular to the leaf, the locking arm further comprising a first follower and a second follower, the locking and unlocking device further comprising a first cam fitted integrally on the elongate structure, and a second cam fitted integrally on the elongate structure, the first follower configured to cooperate with the first cam, such that the second deformable parallelogram mechanism brings the first grasping device facing the locking lever before the locking arm drives the locking lever from the locking position to the unlocking position, while the first grasping device catches on the locking lever, the second follower configured to cooperate with the second cam, such that the second deformable parallelogram mechanism brings the second grasping device facing the locking lever before the locking arm drives the locking lever from the unlocking position to the locking position, while the second grasping device catches on the locking lever.

11. The system according to claim 9, wherein the first grasping device comprises two rollers configured to catch on the locking lever by receiving the locking lever between the two rollers when the locking arm drives the locking lever from the locking position to the unlocking position, the second grasping device comprising two rollers configured to catch on the locking lever when the locking arm drives the locking lever from the locking position to the unlocking position.

12. A method for automatic closure of the leaf in the according to claim 1, the method comprising the following steps:

extending, in which the elongate structure is brought from the retracted position to the extended position by the slide connection;

catching, in which the device for closure and opening catches on the articulation arm;

closing, in which the device for closure and opening draws the articulation arm, in order to bring the leaf towards the closed position; and, locking, in which the device for locking and unlocking brings the locking lever into the locking position, for locking of the leaf, wherein the extending, the catching, and the closing are implemented after receipt by the control device of orders to command closure transmitted remotely by a user, wherein the step of locking is implemented after receipt of orders to command locking from the control device.

13. The method according to claim 12, further comprising a step of:

retracting, in which the elongate structure is brought from the extended position to the retracted position with the slide connection, the retracting following the locking.

14. A method for automatic opening of the leaf of the system of claim 1, the method comprising the following steps:

extending, in which the elongate structure is brought from the retracted position to the extended position by the slide connection;

unlocking, in which the locking and unlocking device brings the locking lever into the unlocking position for unlocking of the leaf; and, opening, in which the device for closure and opening thrusts the articulation arm, in order to bring the leaf towards the open position;

wherein the extending, the unlocking, and the opening are implemented after receipt by the control device of orders to command opening transmitted remotely by a user.

15. The method according to claim 14, further comprising a step of:

retracting, in which the elongate structure is brought from the extended position to the retracted position by the slide connection, the retracting following the opening.

16. An aircraft comprising:

the system according to claim 1.

* * * * *